(12) United States Patent
Kashiwagi

(10) Patent No.: US 8,168,730 B2
(45) Date of Patent: *May 1, 2012

(54) CURABLE SILICONE RUBBER COMPOSITION AND CURED PRODUCT THEREOF

(75) Inventor: Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1076 days.

This patent is subject to a terminal disclaimer.

(21) Appl. No.: 11/623,494

(22) Filed: Jan. 16, 2007

(65) Prior Publication Data

US 2007/0166470 A1     Jul. 19, 2007

(30) Foreign Application Priority Data

Jan. 17, 2006   (JP) .................................. 2006-008274

(51) Int. Cl.
C08G 77/08 (2006.01)

(52) U.S. Cl. .............................. 525/478; 528/15; 528/43

(58) Field of Classification Search .................... 528/15, 528/43; 525/478

See application file for complete search history.

(56) References Cited

U.S. PATENT DOCUMENTS

| | | | |
|---|---|---|---|
| 4,500,584 A | 2/1985 | Modic | |
| 4,882,398 A | 11/1989 | Mbah | |
| 5,034,061 A * | 7/1991 | Maguire et al. .......... | 106/287.14 |
| 5,248,739 A * | 9/1993 | Schmidt et al. ............... | 525/477 |
| 5,373,078 A * | 12/1994 | Juen et al. ....................... | 528/15 |
| 5,623,029 A * | 4/1997 | Yang .............................. | 525/478 |
| 5,645,941 A * | 7/1997 | Meguriya et al. ............. | 428/447 |
| 7,595,113 B2 * | 9/2009 | Miyoshi ......................... | 428/447 |
| 2005/0006794 A1 | 1/2005 | Kashiwagi et al. | |
| 2007/0129508 A1 | 6/2007 | Kashiwagi | |
| 2008/0015326 A1 | 1/2008 | Kodama et al. | |

FOREIGN PATENT DOCUMENTS

| | | |
|---|---|---|
| JP | 63-265956 A | 11/1988 |
| JP | 2-102264 A | 4/1990 |
| JP | 3-33160 A | 2/1991 |
| JP | 4-96004 A | 3/1992 |
| JP | 4-220463 A | 8/1992 |
| JP | 5-295268 A | 11/1993 |
| JP | 2000-198930 A | 7/2000 |
| JP | 2001-2922 A | 1/2001 |
| JP | 2004-43815 A | 2/2004 |
| JP | 2005-42099 A | 2/2005 |
| JP | 2005-158762 A | 6/2005 |
| JP | 2006-213789 | 8/2006 |
| JP | 2007-182549 A | 7/2007 |
| JP | 2008-19385 A | 1/2008 |
| WO | WO 2004/005404 A1 | 1/2004 |

OTHER PUBLICATIONS

Japanese Office Action issued Sep. 7, 2010, in Patent Application No. 2006-008274 (with English-language translation).

* cited by examiner

Primary Examiner — Margaret Moore
(74) Attorney, Agent, or Firm — Oblon, Spivak, McClelland, Maier & Neustadt, L.L.P.

(57) ABSTRACT

Provided is a curable silicone rubber composition, comprising (A) an organopolysiloxane containing two or more aliphatic unsaturated bonds within each molecule, having a viscosity at 25° C. within a range from 10 to 100,000 mm$^2$/s, and containing a phenyl group and/or cyclohexyl group, (B) an organopolysiloxane with a resin structure comprising SiO$_2$ units and $(R^1)_3SiO_{0.5}$ units (wherein, each $R^1$ represents, independently, a vinyl group, an allyl group, or a monovalent hydrocarbon group that contains no aliphatic unsaturated bonds, provided one or more of all the $R^1$ groups within this component (B) represent, independently, a phenyl group or a cyclohexyl group), (C) an organohydrogenpolysiloxane, and (D) a platinum group metal-based catalyst, wherein the component (B) exists in a quantity that represents from 20 to 80% by mass of the combination of the component (A) and the component (B). The composition is capable of forming a cured product with improved hardness, no surface tackiness, and a high refractive index, without any loss in rubber-like properties such as elongation. A substrate such as an electrical or electronic component or an optoelectronic component can be coated with the cured product by applying the composition to the substrate and curing the composition to form the cured product on top of the substrate.

18 Claims, No Drawings

CURABLE SILICONE RUBBER COMPOSITION AND CURED PRODUCT THEREOF

CROSS REFERENCES TO RELATED APPLICATIONS

This application claims priority to Japanese Patent Application No. 2006-008274, filed on Jan. 17, 2006.

BACKGROUND OF THE INVENTION

1. Field of the Invention

The present invention relates to an addition-curable silicone rubber composition and a cured product thereof, and relates particularly to a curable silicone rubber composition that produces a cured product with a superior refractive index, favorable rubber-like properties and strength characteristics, and almost no surface tackiness, as well as a cured product produced from such a composition.

2. Description of the Prior Art

Silicone rubber compositions exhibit excellent properties of weather resistance and heat resistance and the like, and form cured products with superior rubber-like properties such as hardness and elongation, and are consequently used in a wide variety of applications, but because they also exhibit surface tackiness, dust adhesion becomes a problem when such silicone rubber compositions are used as coating agents or the like for electrical and electronic components.

In the case of silicone varnishes that resolve this problem of surface tackiness, the occurrence of cracking becomes a problem. Furthermore, reduced hardness resins produced by adding a silicone oil to a silicone varnish are extremely brittle, and suffer from problems of reliability. A silicone rubber composition capable of forming a cured product with no surface tackiness and excellent crack resistance has been keenly sought for packages such as electrical and electronic components. Furthermore, in the case of optical components and optical semiconductors, increases in the refractive index are seen as a very desirable optical property.

In addition-curable silicone rubber compositions, the addition of a resin-like organopolysiloxane to improve the strength of the cured product is a commonly known technique. However, even in those cases where the strength of a cured product is raised by adding a resin-like organopolysiloxane, surface tackiness and dust adhesion remain problems.

SUMMARY OF THE INVENTION

Accordingly, an object of the present invention is to provide an addition-curable silicone rubber composition that is capable of forming a cured product with improved hardness, no surface tackiness, and a high refractive index, without any loss in rubber-like properties such as elongation, and also to provide a cured product of such a composition.

In order to achieve the above object, the present invention provides a curable silicone rubber composition, comprising:

(A) an organopolysiloxane containing two or more aliphatic unsaturated bonds within each molecule, having a viscosity at 25° C. within a range from 10 to 100,000 mm$^2$/s, and containing either one of, or both, a phenyl group and a cyclohexyl group, (B) an organopolysiloxane with a three dimensional network structure comprising SiO$_2$ units and (R$^1$)$_3$SiO$_{0.5}$ units (wherein, each R$^1$ represents, independently, a vinyl group, an allyl group, or a monovalent hydrocarbon group that contains no aliphatic unsaturated bonds, provided one or more of all R$^1$ groups within this component (B) represent, independently, a phenyl group or a cyclohexyl group), (C) an organohydrogenpolysiloxane, and (D) a platinum group metal-based catalyst, wherein the component (B) exists in a quantity that represents from 20 to 80% by mass of the combination of the component (A) and the component (B).

A second aspect of the present invention provides a cured product obtained by curing the composition.

A third aspect of the present invention provides a coating agent comprising the composition.

A fourth aspect of the present invention provides a method of coating a substrate with a cured product of the composition, comprising the steps of:

applying the composition to the substrate, and curing the composition to form the cured product on top of the substrate, thereby coating the substrate with the cured product.

According to the present invention, a cured product can be obtained that has a high refractive index, excellent impact resistance, and suffers no dust adhesion caused by the type of surface tackiness that represents a significant drawback of silicone elastomers.

DETAILED DESCRIPTION OF THE PREFERRED EMBODIMENTS

A more detailed description of the present invention is presented below. In the following description, "Me" represents a methyl group, "Vi" represents a vinyl group, and "Ph" represents a phenyl group.

[(A) Organopolysiloxane]

The component (A) that functions as the base component of a silicone rubber composition of the present invention is an organopolysiloxane containing two or more aliphatic unsaturated bonds within each molecule, having a viscosity at 25° C. within a range from 10 to 100,000 mm$^2$/s, and containing either one of, or both, a phenyl group and a cyclohexyl group. Any organopolysiloxane that meets these criteria can be used as the component (A), although straight-chain diorganopolysiloxanes in which the principal chain comprises repeating diorganosiloxane units and both molecular chain terminals are blocked with triorganosiloxy groups are particularly desirable. From the viewpoints of the workability and curability of the composition of the present invention, the viscosity of the component (A) at 25° C. should be within a range from 10 to 100,000 mm$^2$/s. The component (A) may use either a single organopolysiloxane, or a combination of two or more different organopolysiloxanes. The aliphatic unsaturated groups of the component (A) may be bonded to silicon atoms at the molecular chain terminals, silicon atoms at non-terminal positions (within the molecular chain), or to both these types of silicon atoms, although organopolysiloxanes containing aliphatic unsaturated groups bonded to at least the silicon atoms at both molecular chain terminals are preferred. The quantity of aliphatic unsaturated groups, relative to the total quantity of silicon atoms within the component (A), is typically within a range from 0.001 to 20 mol %, and is preferably from approximately 0.01 to 10 mol %.

Examples of preferred structures for the component (A) include the organopolysiloxanes represented by a general formula (1) shown below:

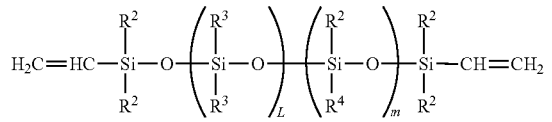
(1)

(wherein, $R^2$ groups represent identical or different unsubstituted or substituted monovalent hydrocarbon groups, $R^3$ groups represent identical or different unsubstituted or substituted monovalent hydrocarbon groups other than a phenyl group or cyclohexyl group, each $R^4$ group represents, independently, a phenyl group or cyclohexyl group, and L and m each represent either 0 or a positive integer, although when m=0, at least one of all the $R^2$ groups is a phenyl group or a cyclohexyl group).

In the general formula (1), examples of $R^2$ include lower alkyl groups such as a methyl group, ethyl group, propyl group, or butyl group; cycloalkyl groups such as a cyclohexyl group; alkenyl groups such as a vinyl group or allyl group; aryl groups such as a phenyl group, tolyl group, or xylyl group; aralkyl groups such as a benzyl group; and groups in which a portion of, or all of, the hydrogen atoms within the above hydrocarbon groups have been substituted with a halogen atom or a cyano group or the like, such as a chloromethyl group, cyanoethyl group, or 3,3,3-trifluoropropyl group. Of these, groups in which the number of carbon atoms is within a range from 1 to 10, and particularly from 1 to 6, are preferred.

Examples of $R^3$ include lower alkyl groups such as a methyl group, ethyl group, propyl group, or butyl group; cycloalkyl groups other than a cyclohexyl group, such as a cyclopentyl group; alkenyl groups such as a vinyl group or allyl group; aryl groups other than a phenyl group, such as a tolyl group or xylyl group; aralkyl groups such as a benzyl group; and groups in which a portion of, or all of, the hydrogen atoms within the above hydrocarbon groups have been substituted with a halogen atom or a cyano group or the like, such as a chloromethyl group, cyanoethyl group, or 3,3,3-trifluoropropyl group. Of these, groups in which the number of carbon atoms is within a range from 1 to 10, and particularly from 1 to 6, are preferred, and a methyl group is particularly desirable.

In addition, L and m represent either 0 or a positive integer, and in particular, represent numbers that cause the viscosity of the component (A) at 25° C. to fall within the range described above. L and m are preferably integers that satisfy the formula: $0<L+m\leq 10{,}000$, even more preferably $8\leq L+m\leq 2{,}000$, and even more preferably $10\leq L+m\leq 1{,}200$, and moreover also satisfy the formula: $0\leq m/(L+m)\leq 1$, even more preferably $0.05\leq m/(L+m)\leq 0.8$, and even more preferably $0.1\leq m/(L+m)\leq 0.4$. However, when m=0, at least one of all the $R^2$ groups within the component (A) must represent a phenyl group or a cyclohexyl group.

Specific examples of the component (A) include the organopolysiloxanes represented by the formulas shown below, although the component (A) is not limited to these structures.

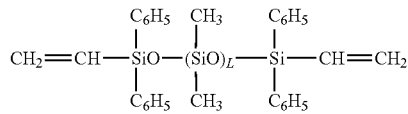

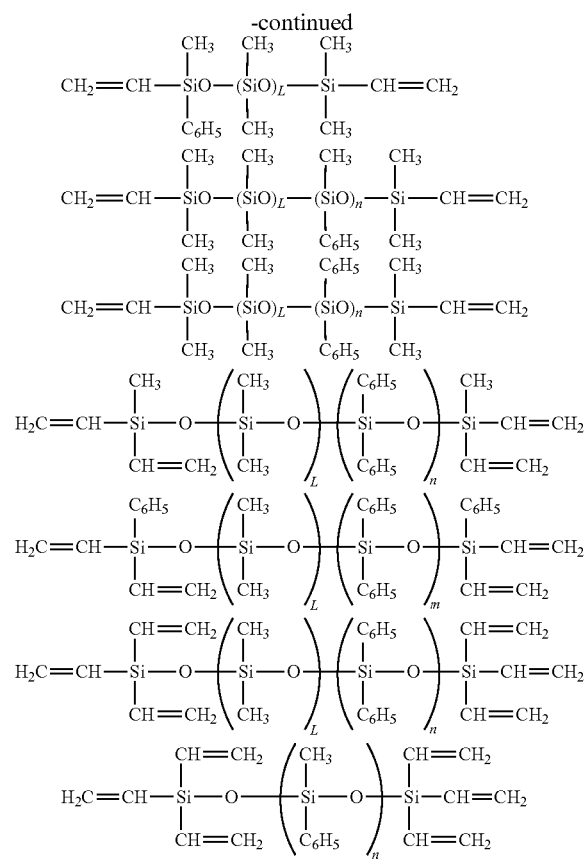

(In each of the above formulas, L and m are as defined above, and n represents a positive integer that is identical to m with the exception that it must satisfy the formula: $0<n/(L+n)\leq 1$.)

Furthermore, additional specific examples of the component (A) include organopolysiloxanes represented by formulas in which the phenyl groups ($C_6H_5$) within each of the above formulas have been substituted with cyclohexyl groups.

[(B) Organopolysiloxane with Resin Structure]

The component (B) is an organopolysiloxane with a resin structure (namely, a three dimensional network structure), comprising $SiO_2$ units (hereafter also referred to as a-units) and $(R^1)_3SiO_{0.5}$ units (hereafter also referred to as b-units) (wherein, each $R^1$ represents, independently, a vinyl group, an allyl group, or a monovalent hydrocarbon group that contains no aliphatic unsaturated bonds, provided one or more of all the $R^1$ groups within this component (B), and preferably from 1 to 50 mol %, even more preferably from 3 to 30 mol %, and most preferably from 5 to 25 mol %, of all the $R^1$ groups within this component (B), represent, independently, a phenyl group or a cyclohexyl group). The component (B) is added to a composition of the present invention to improve the physical strength and surface tackiness of the cured product obtained from the composition. In the composition, the component (B) exists in a quantity that represents from 20 to 80% by mass of the combination of the component (A) and the component (B). The weight average molecular weight of the component (B), measured by gel permeation chromatography and calculated against polystyrene standards, is typically within a range from 500 to 10,000. The component (B) may use either a single compound, or a combination of two or more different compounds. The b-unit may also use either a single unit, or a combination of two or more different units.

In those cases where $R^1$ is a monovalent hydrocarbon group that contains no aliphatic unsaturated bonds, specific examples of suitable groups include lower alkyl groups such as a methyl group, ethyl group, propyl group, or butyl group; cycloalkyl groups such as a cyclohexyl group; aryl groups such as a phenyl group, tolyl group, or xylyl group; aralkyl groups such as a benzyl group; and groups in which a portion of, or all of, the hydrogen atoms within the above hydrocarbon groups have been substituted with a halogen atom or a cyano group or the like, such as a chloromethyl group, cyanoethyl group, or 3,3,3-trifluoropropyl group. Of these, groups in which the number of carbon atoms is within a range from 1 to 10, and particularly from 1 to 6, are preferred. Typically, the quantity of vinyl groups or allyl groups is within a range from 0 to 50 mol %, preferably from 1 to 30 mol %, and even more preferably from 3 to 20 mol %, of all the $R^1$ groups within the component (B). The component (B) is preferably a vinyl group-containing or allyl group-containing organopolysiloxane with a resin structure.

The above units are preferably combined such that the value of the molar ratio b/a, which represents the quantity of b-units relative to the quantity of a-units, is within a range from 0.3 to 3, even more preferably from 0.5 to 1.5, and even more preferably from 0.7 to 1.0.

The component (B) can be synthesized easily, for example, by mixing together the source compounds that yield each of the units, in quantities that produce a value for the molar ratio b/a that falls within the aforementioned range, and then conducting a co-hydrolysis in the presence of acid. Examples of source compounds for the a-units include sodium silicate, alkyl silicates, polyalkyl silicates, and silicon tetrachloride. The source compound for the a-units may use either a single compound, or a combination of two or more different compounds. Furthermore, examples of source compounds for the b-units include organosilicon compounds such as the triorganochlorosilanes and hexaorganodisiloxanes represented by the formulas shown below. The source compound for the b-units may also use either a single compound, or a combination of two or more different compounds.

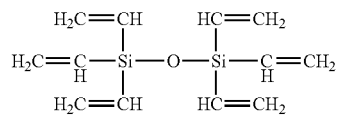

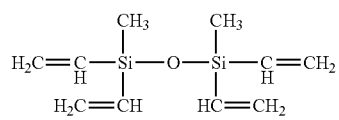

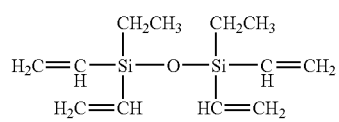

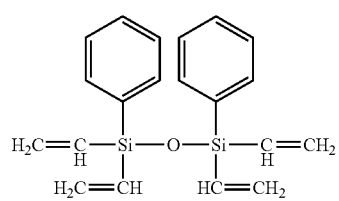

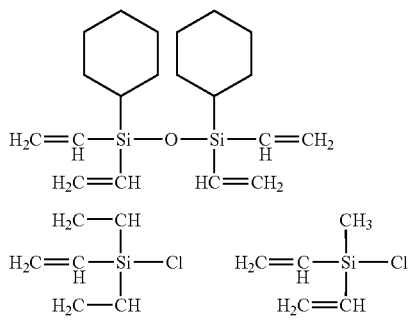

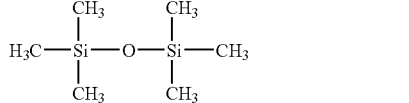

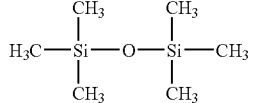

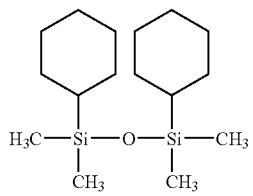

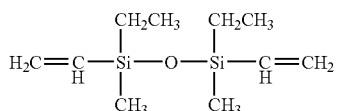

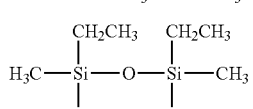

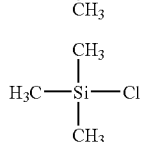

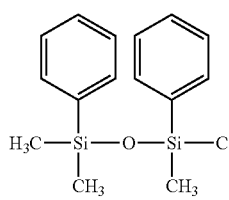

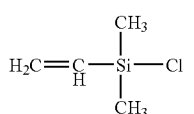

$(CH_3)(CH_2=CH)_2SiCl$ $(CH_2=CH)_3SiCl$ $(CH_3)(C_6H_5)(CH_2=CH)SiCl$

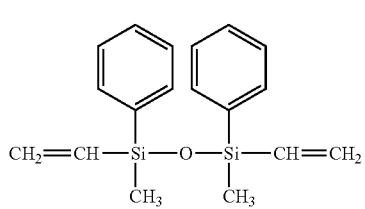

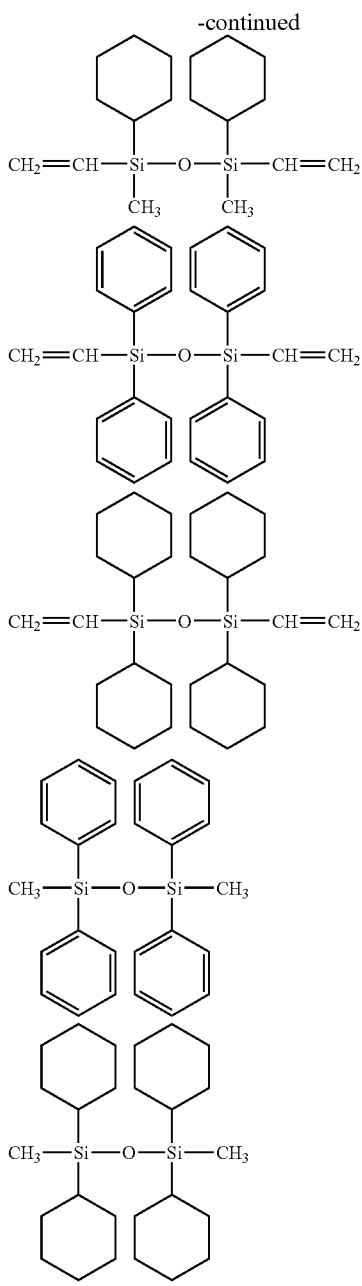

[(C) Organohydrogenpolysiloxane]

The organohydrogenpolysiloxane of the component (C) functions as a cross-linking agent. A cured product is formed from a composition of the present invention as a result of an addition reaction between the hydrogen atoms bonded to silicon atoms (SiH groups) within this component (C), the aliphatic unsaturated bonds bonded to silicon atoms within the component (A), and where present, the vinyl groups and/or allyl groups bonded to silicon atoms within the component (B). The molecular structure of this component (C) may be a straight-chain, branched-chain, cyclic, branched cyclic, or network-type structure. There are no particular restrictions on the positions of the SiH groups, and in those cases where the component (C) has molecular chain terminals, the SiH groups may exist solely at the molecular chain terminals, solely at non-terminal positions within the molecular chain, or at both of these positions. The component (C) may use either a single organohydrogenpolysiloxane, or a combination of two or more different organohydrogenpolysiloxanes.

Suitable examples of the component (C) include organohydrogenpolysiloxanes represented by an average composition formula (2) shown below:

$$H_c(R^5)_d SiO_{(4-c-d)/2} \quad (2)$$

(wherein, the $R^5$ groups represent identical or different unsubstituted or substituted monovalent hydrocarbon groups that contain no aliphatic unsaturated bonds, and c and d are numbers that satisfy the formulas: $0.001 \leq c < 2$, $0.7 \leq d \leq 2$, and $0.8 \leq c+d \leq 3$), which contain at least two (typically from 2 to 300), and preferably 3 or more (for example, from 3 to 200, and particularly from 4 to approximately 100) SiH groups within each molecule.

In the above formula (2), examples of the $R^5$ groups include identical or different unsubstituted or substituted monovalent hydrocarbon groups, which contain no aliphatic unsaturated bonds and contain from 1 to 10 carbon atoms, and particularly from 1 to 7 carbon atoms. Examples of suitable groups include all those groups other than the alkenyl groups described above in relation to the substituent group $R^2$ within the aforementioned general formula (1), and specific examples include lower alkyl groups such as a methyl group, and aryl groups such as a phenyl group.

Furthermore, c and d are numbers that satisfy the formulas: $0.001 \leq c < 2$, $0.7 \leq d \leq 2$, and $0.8 \leq c+d \leq 3$, and preferably satisfy the formulas: $0.05 \leq c \leq 1$, $0.8 \leq d \leq 2$, and $1 \leq c+d \leq 2.7$. The number of silicon atoms within the organohydrogenpolysiloxane of the component (C) is typically within a range from 2 to 300 atoms, and preferably from 3 to 200 atoms, and even more preferably from 4 to approximately 100 atoms.

Specific examples of the component (C) include pentamethyltrihydrogencyclotetrasiloxane, 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane, and dimethylsiloxane with both terminals blocked with trimethylsiloxy groups, copolymers of methylhydrogensiloxane, methylphenylsiloxane, and dimethylsiloxane with both terminals blocked with trimethylsiloxy groups, copolymers of methylhydrogensiloxane, dimethylsiloxane, and diphenylsiloxane with both terminals blocked with dimethylhydrogensiloxy groups, copolymers of methylhydrogensiloxane, dimethylsiloxane, and methylphenylsiloxane with both terminals blocked with dimethylhydrogensiloxy groups, copolymers comprising $(CH_3)_2HSiO_{1/2}$ units, $(CH_3)_3SiO_{1/2}$ units, and $SiO_{4/2}$ units, copolymers comprising $(CH_3)_2HSiO_{1/2}$ units and $SiO_{4/2}$ units, and copolymers comprising $(CH_3)_2HSiO_{1/2}$ units, $SiO_{4/2}$ units, and $(C_6H_5)_3SiO_{1/2}$ units.

The component (C) can normally be obtained either by hydrolysis of a chlorosilane such as $R^5SiHCl_2$, $(R^5)_3SiCl$, $(R^5)_2SiCl_2$ or $(R^5)_2SiHCl$ (wherein, $R^5$ is as defined above), or by equilibration of the siloxane obtained upon hydrolysis.

The blend quantity of the component (C) must be effective in curing the composition of the present invention, and the quantity of SiH groups within the component (C) is typically within a range from 0.1 to 4.0 mols, even more preferably from 1.0 to 3.0 mols, and most preferably from 1.2 to 2.8 mols, for each 1 mol of the combination of aliphatic unsaturated bonds bonded to silicon atoms within the component (A), and where present, the vinyl groups and/or allyl groups bonded to silicon atoms within the component (B). Provided the blend quantity of the component (C) falls within this range, the curing reaction proceeds satisfactorily, enabling a silicone rubber cured product to be produced easily from the composition of the present invention, and moreover, the quantity of residual unreacted SiH groups within the cured product can be suppressed to a minimal quantity, meaning the cured product is more resistant to changes in the physical properties of the rubber over time.

[(D) Platinum Group Metal-Based Catalyst]

The platinum group metal-based catalyst of the component (D) is added to promote the addition curing reaction within the composition of the present invention, and may use either a single catalyst, or a combination of two or more different catalysts. Examples of the component (D) include platinum-based, palladium-based, and rhodium-based catalysts, although from the viewpoint of cost, platinum-based catalysts are particularly preferred. Specific examples of suitable catalysts include $H_2PtCl_6 \cdot kH_2O$, $K_2PtCl_6$, $KHPtCl_6 \cdot kH_2O$, $K_2PtCl_4$, $K_2PtCl_4 \cdot kH_2O$, $PtO_2 \cdot kH_2O$, $PtCl_4 \cdot kH_2O$, $PtCl_2$ and $H_2PtCl_4 \cdot kH_2O$ (where in these formulas, k represents a positive integer), as well as complexes of these compounds with hydrocarbons, alcohols, or vinyl group-containing organopolysiloxanes.

The blend quantity of the component (D) need only be an effective catalytic quantity, and a preferred quantity, calculated as a mass of the platinum group metal relative to 100 parts by mass of the combination of the components (A) to (D), is within a range from 0.1 to 500 ppm, and even more preferably from 0.5 to 200 ppm.

[Other Components]

In addition to the components (A) to (D) described above, if required, the composition of the present invention may also contain a variety of conventional additives. For example, reinforcing inorganic fillers such as fumed silica and fumed titanium dioxide, and non-reinforcing inorganic fillers such as calcium carbonate, calcium silicate, titanium dioxide, ferric oxide, carbon black and zinc oxide may be added to a composition of the present invention in quantities totaling not more than 600 parts by mass (namely, from 0 to 600 parts by mass, typically from 1 to 600 parts by mass, and preferably from 10 to 400 parts by mass) per 100 parts by mass of the combination of components (A) to (D).

[Preparation and Curing of Silicone Rubber Composition]

A silicone rubber composition of the present invention is prepared by mixing each of the above components uniformly together, although in order to ensure curing does not proceed, the composition is usually stored as two separate liquids, and these two liquids are then mixed together and cured at the time of use. Needless to say, a one-part type composition containing a small quantity of a curing inhibitor such as acetylene alcohol is also possible.

A composition of the present invention can be applied to a predetermined substrate in accordance with the intended use, and subsequently cured. This enables the substrate to be coated with a cured product of the composition. Examples of the substrate include electrical and electronic components and optoelectronic components. Specific examples of electrical and electronic components include transistors, IC, CPU, memory, sensors, and electric cells. Examples of optoelectronic components include optical semiconductors and the like, and specific examples include light-emitting semiconductor elements such as light emitting diodes and laser diodes; and light-receiving semiconductor elements such as photodiodes, phototransistors, image sensors (such as CCD and CMOS), and IR sensors. The curing conditions may be similar to those used for conventional addition reaction-curable silicone rubber compositions. For example, a composition of the present invention cures satisfactorily even at room temperature (25° C.), but if required, may also be cured by heating. If heating is used, the temperature is typically within a range from 60 to 200° C.

[Applications]

A composition of the present invention cures rapidly, using heating where required, and forms an elastic cured product that exhibits a high degree of hardness and no surface tackiness. The cured product can be used in a wide variety of applications where the adhesiveness of silicone cured products normally causes problems. Specifically, the cured product can be used as a protective coating agent, molding agent or lens material for electrical and electronic components and optoelectronic components, as well as for the potting or casting of such components, and can also be used as a surface coating for silicone rubber keyboards.

EXAMPLES

The present invention is described in further detail below using a series of examples and comparative examples, although the present invention is in no way limited by these examples. In the following examples, the units "parts" refer to "parts by mass", and viscosity values refer to values measured at 25° C.

Example 1

To (a) 50 parts of an organopolysiloxane (viscosity: 20,000 mm²/s) represented by a formula shown below:

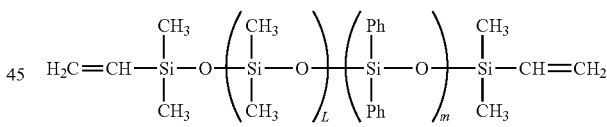

(wherein, L=413 and m=85) were added (b) 50 parts of a resin-structure vinylphenylmethylpolysiloxane (PVMQ) comprising 50 mol % of $SiO_2$ units, 42.5 mol % of $(CH_3)_3SiO_{0.5}$ units, and 7.5 mol % of $MePhViSiO_{0.5}$ units, (c) a sufficient quantity of an organohydrogenpolysiloxane represented by a formula shown below to provide 1.5 mols of SiH groups for each 1 mol of silicon atom-bonded vinyl groups within the components (a) and (b) (hereafter, this ratio of SiH groups to vinyl groups may also be represented using the expression "SiH/SiVi"),

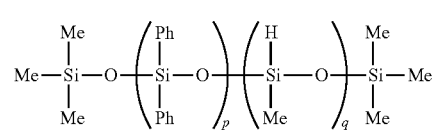

(wherein, p=2 and q=8)

and (d) 0.05 parts of an octyl alcohol-modified solution of chloroplatinic acid (platinum element content: 2% by mass), and the resulting mixture was then stirred thoroughly, yielding a silicone rubber composition. This composition was then heat-molded for 4 hours at 150° C., thus forming a cured product. The refractive index of the cured product at 25° C. was measured using an Abbe refractometer, and the tensile strength, the hardness (the type D hardness), and the breaking elongation of the cured product were measured in accordance with JIS K 6249. The surface tackiness of the cured product was ascertained by finger touch. In addition, the cured product was placed in a sample of cotton dust, and following removal from the dust, was blown with compressed air to test whether the dust could be removed from the cured product surface. Moreover, a sample obtained by pouring the silicone rubber composition into an aluminum dish (diameter: 6 cm, depth: 0.6 mm) and then curing the composition was subjected to a hot-cold temperature cycling process between −50° C. and 150° C. (which involved repeating a cycle comprising holding the sample at a temperature of −50° C. for 30 minutes and then allowing the sample to stand in a thermostatic chamber at 150° C. for 30 minutes), and the sample was checked for the occurrence of cracking. The results of each of the measurements are shown in Table 1.

Example 2

To (a) 50 parts of an organopolysiloxane (viscosity: 4,000 mm$^2$/s) represented by a formula shown below:

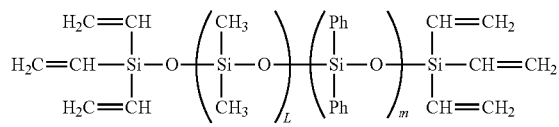

(wherein, L=70 and m=30)
were added (b) 50 parts of a resin-structure vinylphenylmethylpolysiloxane (PVMQ) comprising 50 mol % of $SiO_2$ units, 35 mol % of $(CH_3)_3SiO_{0.5}$ units, and 15 mol % of $MePhViSiO_{0.5}$ units, (c) a sufficient quantity of an organohydrogenpolysiloxane represented by a formula shown below to provide 1.5 mols of SiH groups for each 1 mol of vinyl groups within the components (a) and (b),

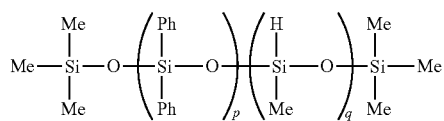

(wherein, p=4 and q=8)
and (d) 0.05 parts of an octyl alcohol-modified solution of chloroplatinic acid (platinum element content: 2% by mass), and the resulting mixture was then stirred thoroughly, yielding a silicone rubber composition. Using the same procedure as the example 1, cured products were then formed from this composition, and the physical properties of these cured product were measured. The results of each of the measurements are shown in Table 1.

Example 3

30 parts of the organopolysiloxane (a) used in the example 1, 70 parts of the PVMQ (b) used in the example 1, 4.3 parts of the organohydrogenpolysiloxane (c) used in the example 1, and 0.05 parts of the octyl alcohol-modified solution of chloroplatinic acid (d) used in the example 1 were mixed together, and then using the same procedure as the example 1, a silicone rubber composition was prepared, cured products were formed from this composition, and the physical properties of these cured product were measured. The results of each of the measurements are shown in Table 1.

Example 4

30 parts of the organopolysiloxane (a) used in the example 2, 70 parts of the PVMQ (b) used in the example 1, 4.3 parts of the organohydrogenpolysiloxane (c) used in the example 1, and 0.05 parts of the octyl alcohol-modified solution of chloroplatinic acid (d) used in the example 1 were mixed together, and then using the same procedure as the example 1, a silicone rubber composition was prepared, cured products were formed from this composition, and the physical properties of these cured product were measured. The results of each of the measurements are shown in Table 1.

Comparative Example 1

To (a') 50 parts of an organopolysiloxane represented by a formula shown below:

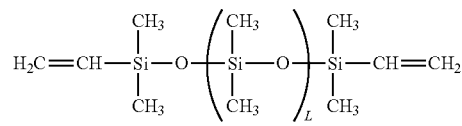

(wherein, L=450)
were added (b') 50 parts of a resin-structure vinylmethylsiloxane (VMQ) comprising 50 mol % of $SiO_2$ units, 42.5 mol % of $(CH_3)_3SiO_{0.5}$ units, and 7.5 mol % of $ViMe_2SiO_{0.5}$ units, (c) a sufficient quantity of an organohydrogenpolysiloxane represented by a formula shown below to provide 1.5 mols of SiH groups for each 1 mol of vinyl groups within the components (a') and (b'),

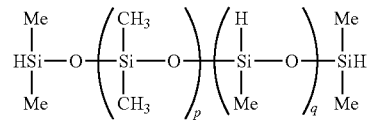

(wherein, p=10 and q=8)
and (d) 0.05 parts of an octyl alcohol-modified solution of chloroplatinic acid (platinum element content: 2% by mass), and the resulting mixture was then stirred thoroughly, yielding a silicone rubber composition. Using the same procedure as the example 1, cured products were then formed from this composition, and the physical properties of these cured product were measured. The results of each of the measurements are shown in Table 2.

Comparative Example 2

To (a') 50 parts of an organopolysiloxane represented by a formula shown below:

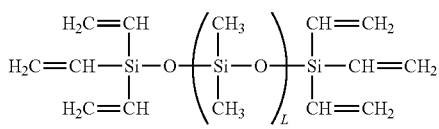

(wherein, L=450)
were added (b') 50 parts of a resin-structure vinylmethylsiloxane (VMQ) comprising 50 mol % of $SiO_2$ units, 42.5 mol % of $(CH_3)_3SiO_{0.5}$ units, and 7.5 mol % of $ViMe_2SiO_{0.5}$ units, (c) a sufficient quantity of an organohydrogenpolysiloxane represented by a formula shown below to provide 1.5 mols of SiH groups for each 1 mol of vinyl groups within the components (a') and (b'),

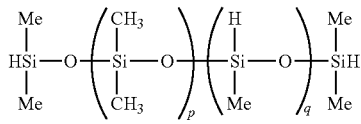

(wherein, p=10 and q=8)
and (d) 0.05 parts of an octyl alcohol-modified solution of chloroplatinic acid (platinum element content: 2% by mass), and the resulting mixture was then stirred thoroughly, yielding a silicone rubber composition. Using the same procedure as the example 1, cured products were then formed from this composition, and the physical properties of these cured product were measured. The results of each of the measurements are shown in Table 2.

Comparative Example 3

Using a commercially available silicone varnish (product name: KJR-632, manufactured by Shin-Etsu Chemical Co., Ltd.), and using the same procedure as the example 1, cured products were formed by curing the varnish, and the physical properties of these cured product were measured. The results of each of the measurements are shown in Table 2.

TABLE 1

|  | Example | | | |
| --- | --- | --- | --- | --- |
|  | 1 | 2 | 3 | 4 |
| SiH/SiVi | 1.5 | 1.5 | 1.5 | 1.5 |
| Curing conditions | 150° C./ | 150° C./ | 150° C./ | 150° C./ |
|  | 4 hours | 4 hours | 4 hours | 4 hours |
| Refractive index | 1.46 | 1.50 | 1.46 | 1.50 |
| Hardness (type D) | 17 | 20 | 35 | 40 |
| Breaking elongation (%) | 30 | 30 | 25 | 10 |
| Tensile strength (MPa) | 3 | 3 | 3 | 3 |
| Dust adhesion due to surface tackiness | No | No | No | No |
| Thermal shock test (−50° C. to 150° C., 1000 cycles) | No cracking | No cracking | No cracking | No cracking |

TABLE 2

|  | Comparative Example | | |
| --- | --- | --- | --- |
|  | 1 | 2 | 3 |
| SiH/SiVi | 1.5 | 1.5 | 1.5 |
| Curing conditions | 150° C./ | 150° C./ | 150° C./ |

TABLE 2-continued

|  | Comparative Example | | |
| --- | --- | --- | --- |
|  | 1 | 2 | 3 |
|  | 4 hours | 4 hours | 4 hours |
| Refractive index | 1.41 | 1.41 | 1.51 |
| Hardness (type D) | 12 | 15 | 80 |
| Breaking elongation (%) | 30 | 30 | — |
| Tensile strength (MPa) | 6 | 7 | — |
| Dust adhesion due to surface tackiness | Yes | Yes | No |
| Thermal shock test (−50° C. to 150° C., 1000 cycles) | No cracking | No cracking | Cracking after 2 cycles |

What is claimed is:
1. A curable silicone rubber composition, comprising:
(A) an organopolysiloxane containing two or more aliphatic unsaturated bonds within each molecule, having a viscosity at 25° C. within a range from 10 to 100,000 $mm^2/s$, and containing either one of, or both, a phenyl group and a cyclohexyl group,
(B) an organopolysiloxane with a three dimensional network structure comprising $SiO_2$ units and $(R^1)_3SiO_{0.5}$ units, wherein, each $R^1$ represents, independently, a vinyl group, an allyl group, or a monovalent hydrocarbon group that contains no aliphatic unsaturated bonds, provided one or more of all $R^1$ groups within this component (B) represent, independently, a phenyl group or a cyclohexyl group, wherein the quantity of vinyl groups is within a range from 1 to 30 mol % of all the $R^1$ groups within the component B,
(C) an organohydrogenpolysiloxane, and
(D) a platinum group metal-based catalyst, wherein
said component (B) exists in a quantity that represents from 20 to 80% by mass of a combination of said component (A) and said component (B), and
wherein said component (A) is represented by formula (1) shown below:

(1)

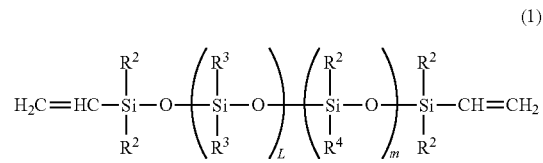

wherein $R^2$ groups represent identical or different unsubstituted or substituted monovalent hydrocarbon groups, $R^3$ groups represent identical or different unsubstituted or substituted monovalent hydrocarbon groups other than a phenyl group or cyclohexyl group, each $R^4$ group represents, independently, a phenyl group or a cyclohexyl group, and L and m each represent either 0 or a positive integer, although when m=0, at least one of all $R^2$ groups is a phenyl group or a cyclohexyl group, and
wherein L and m in formula (1) are integers that satisfy the formula: $0 < L+m \leq 1{,}200$ and the formula: $0 \leq m/(L+m) \leq 0.4$.
2. The composition according to claim 1, wherein said component (A) is a straight-chain diorganopolysiloxane.
3. The composition according to claim 1, wherein, in said component (B), the molar ratio of said $(R^1)_3SiO_{0.5}$ units to said $SiO_2$ units is within a range from 0.3 to 3.

4. The composition according to claim 1, wherein, in said component (B), the molar ratio of said $(R^1)_3SiO_{0.5}$ units to said $SiO_2$ units is within a range from 0.3 to 1.0.

5. A cured product obtained by curing the composition according to claim 1.

6. A coating agent, comprising the composition according to claim 1.

7. A cured product obtained by curing the composition according to claim 2.

8. A cured product obtained by curing the composition according to claim 4.

9. A cured product obtained by curing the composition according to claim 3.

10. A coating agent, comprising the composition according to claim 2.

11. A coating agent, comprising the composition according to claim 4.

12. A coating agent, comprising the composition according to claim 3.

13. A method of coating a substrate with a cured product of the composition according to claim 1, comprising the steps of:
    applying said composition to said substrate, and
    curing said composition to form said cured product on top of said substrate, thereby coating said substrate with said cured product.

14. The method according to claim 13, wherein said substrate is an electrical or electronic component.

15. The method according to claim 13, wherein said substrate is an optoelectronic component.

16. A method of coating a substrate with a cured product of the composition according to claim 2, comprising the steps of:
    applying said composition to said substrate, and
    curing said composition to form said cured product on top of said substrate, thereby coating said substrate with said cured product.

17. A method of coating a substrate with a cured product of the composition according to claim 4, comprising the steps of:
    applying said composition to said substrate, and
    curing said composition to form said cured product on top of said substrate, thereby coating said substrate with said cured product.

18. A method of coating a substrate with a cured product of the composition according to claim 3, comprising the steps of:
    applying said composition to said substrate, and
    curing said composition to form said cured product on top of said substrate, thereby coating said substrate with said cured product.

* * * * *